United States Patent [19]

Nolan

[11] Patent Number: 4,546,424
[45] Date of Patent: Oct. 8, 1985

[54] COMPENSATED RAMP GENERATING CIRCUIT FOR CONTROLLING SCR FIRING

[75] Inventor: Dennis C. Nolan, Milwaukee, Wis.

[73] Assignee: Allen-Bradley Company, Milwaukee, Wis.

[21] Appl. No.: 532,065

[22] Filed: Sep. 14, 1983

[51] Int. Cl.[4] .............................................. H02P 13/26
[52] U.S. Cl. ...................................... 363/87; 323/242; 323/326; 307/263
[58] Field of Search .................. 323/242, 243, 326; 363/84, 85, 86, 87, 129; 307/263; 328/185

[56] References Cited

U.S. PATENT DOCUMENTS 4,268,794  5/1981  Handte et al. ...................... 328/185
4,438,466  3/1984  Fawkes et al. ...................... 328/185

OTHER PUBLICATIONS

SWEO Engineering, Inc., Ramp Generating Circuit, 1981 as disclosed in Exhibit A.
"Thyristor Control Theory", General Electric Company Manual, circa. 1980, pp. 97–101.

Primary Examiner—Peter S. Wong
Assistant Examiner—Judson H. Jones
Attorney, Agent, or Firm—Quarles & Brady

[57] ABSTRACT

Ramp generating circuits, for synchronizing SCR firing control signals to the phase-varying signals derived from a three-phase AC power source, each have a compensating circuit connected across an operational amplifier and a capacitor to control the peak value of the ramp signal generated at the output of the operational amplifier. The compensating circuit maintains the peak value of the ramp signal close to its calculated value despite variations in the actual value of the capacitor from its nominal or rated value and despite changes in power line frequency between 50 hertz and 60 hertz. The compensating circuit includes a T-section passive network, a voltage-following amplifier and several feedback resistors connected from the output of the operational amplifier to its inverting (−) input. This compensating circuit increases or decreases charging current to the capacitor according to the type of compensation that is necessary.

3 Claims, 6 Drawing Figures

COMPENSATED RAMP GENERATING CIRCUIT FOR CONTROLLING SCR FIRING

BACKGROUND OF THE INVENTION

1. Field of the Invention

The invention relates to circuits for generating a series of pulses that are synchronized to the phases of a three-phase power source. In the example described here, the invention is applied to control SCR firing in a DC motor control.

2. Description of the Prior Art

DC motors are powered from a three-phase AC power source which provides six individual line-to-line signals that vary by 60° when viewed as time-varying waveforms. Each phase signal can be rectified, and the average of these six rectified signals provides a DC signal to the motor armature. Where the motor includes a field winding, rectified signals are also used to provide direct current to the field winding.

The primary electronic component for rectifying the AC phase signals is the silicon-controlled rectifier (SCR). In a bidirectional DC motor speed control of the armature-current reversing type, two groups of six SCR's are necessary. One group is actuated to generate armature current in a forward direction and a second group is actuated to generate armature current in a reverse direction. To avoid the occurrence of faults that could result from the effects of counter-EMF in DC electrical motors, there must be precise timing of the pulses which fire the SCR's.

The operation of SCR's must be synchronized to respective phase-varying signals derived from the AC power source. The firing of the SCR's is used to control the amount of direct current supplied to the motor armature, or received from the motor armature when it is regenerating. The motor control generates a firing angle command signal which is applicable to all of the AC signals, and this firing angle signal must be synchronized with each individual AC signal. It has been the practice to use a ramp generating circuit to generate a sawtooth waveform at twice the AC line frequency, and to compare the value of that signal with the firing angle command signal. Where the firing angle command signal is detected during a portion of the sawtooth waveform, the time of its occurrence is marked by the generation of a digital signal which becomes a time-synchronized pulse. Using three ramp and pulse generating circuits, the firing angle command can be synchronized to the six AC line-to-line signals AB, AC, BC, BA, CA and CB, which are used when power is supplied by a three-phase AC source.

A technical problem arises in ramp generating circuits due to variations from the nominal or assumed values of capacitors used in such circuits. If the values are different than assumed, SCR firing may not occur at the precise time desired. Unbalanced firing may occur if the value of a capacitor in one ramp generating circuit differs from the value of a capacitor in the other two ramp generating circuits required for use with a three-phase AC source.

A further problem is the requirement for operation of the motor control circuitry at either 50 hertz, which is the power line frequency in many countries outside the United States, or at 60 hertz, which is the line frequency of power systems in the United States. The prior art has typically required connection of jumper wires or a change of resistors to change from 50 hertz to 60 hertz operation. A circuit that would operate automatically with either line frequency would eliminate the jumper-wiring or resistor selection step, and would provide convenience to the manufacturer and user.

SUMMARY OF THE INVENTION

The invention resides in a ramp generating circuit with an integrating circuit of the type having a capacitor that is charged to generate a ramp signal, with a reset circuit connected across the capacitor and responsive to phase-synchronizing reference signals to discharge the capacitor in relationship to the AC line frequency, and with a feedback compensation circuit connected across the capacitor to couple a charging current to the capacitor. This feedback circuit compensates for variance between the actual value and the nominal value of the capacitor and also compensates for use of the circuit at different power line frequencies, e.g. 50 hertz or 60 hertz.

These and other objects and advantages of the invention will be apparent from the detailed description which follows and which refers to drawings that are incorporated herein. The drawings illustrate a preferred embodiment of the invention, but the invention is applicable to other embodiments as well, and therefore reference should be made to the claims herein for determining the scope of the invention.

DETAILED DESCRIPTION OF THE PREFERRED EMBODIMENT

Figure 1:
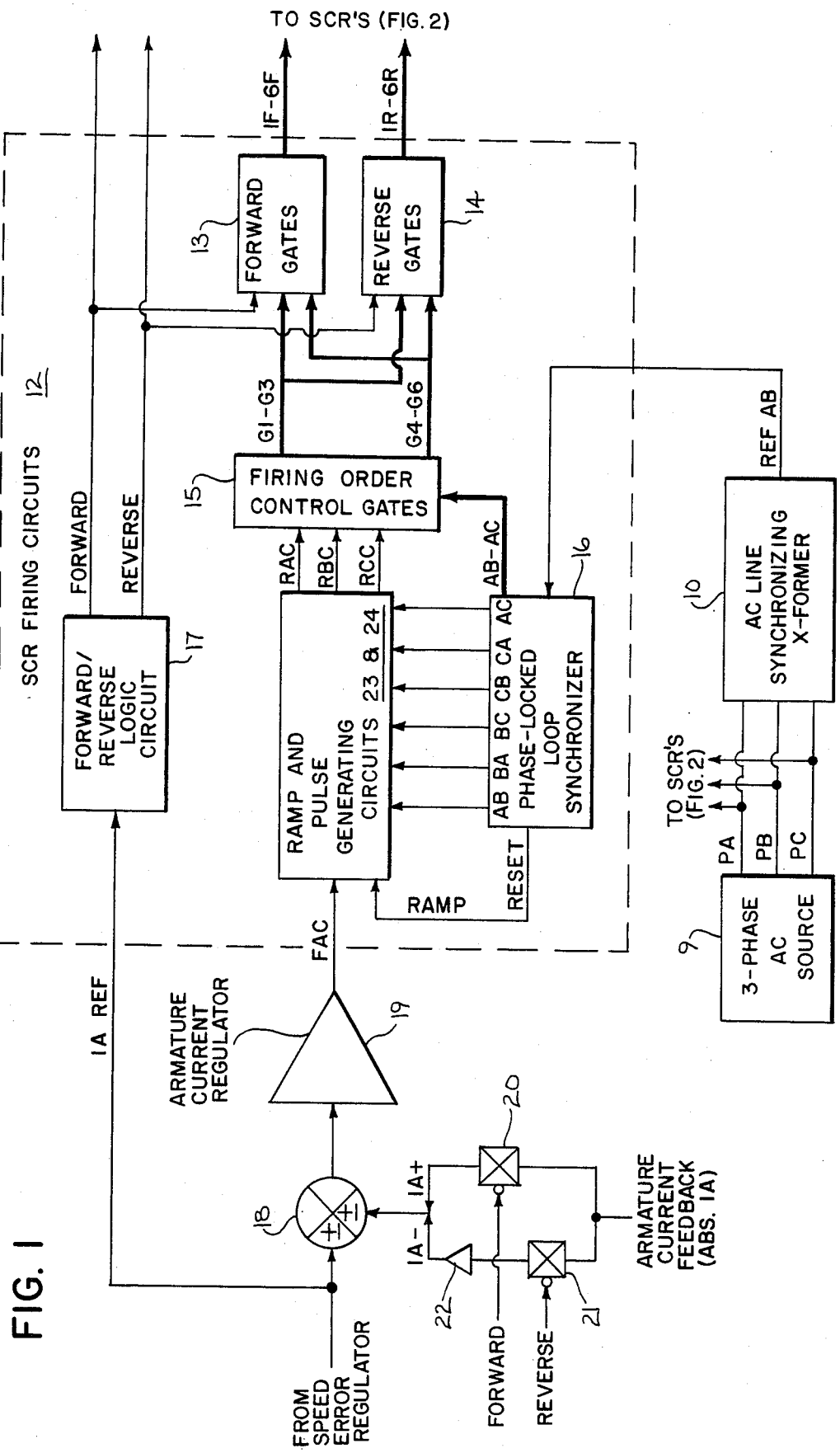
FIG. 1 is a block diagram showing the SCR firing circuits of a DC motor control in which the present invention is utilized.
Figure 2:
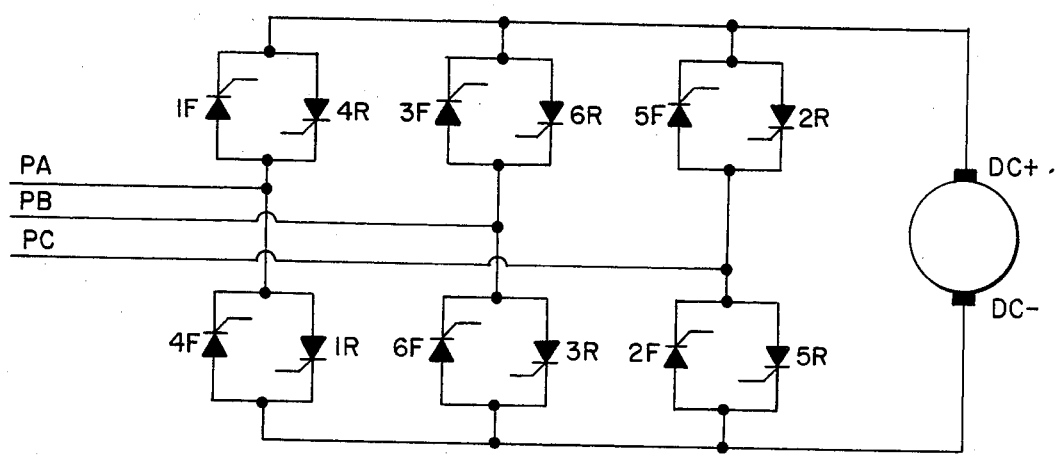
FIG. 2 is an electrical diagram of the SCR bridge network used in the motor control of the present invention.

FIG. 1 shows a portion of a motor control for coupling a three-phase AC power source 9 to a DC motor armature 11 seen in FIG. 2. The motor control is more fully described in a concurrently filed U.S. patent application Ser. No. 06/532067 filed 9/14/83 of Berkopec et al for a "Motor Field Regulator with Speed Feedback." The invention relates to only a portion of the SCR firing circuits 12 in the motor control, however, a somewhat broader description of these firing circuits 12 will contribute to a better understanding and appreciation of the invention.

The motor control in the present example is of the four-quadrant type in which either the direction of armature rotation or the direction of applied torque can be reversed. One way to reverse the applied torque is to change the direction of armature current, and the motor control seen in part in FIG. 1 is of the armature-current reversing type. For armature current reversal, six phase-varying AC line signals are rectified to provide direct current in a forward direction, and six phase-varying AC line signals are rectified to provide current in a reverse direction. SCR's (silicon controlled rectifiers) 1F–6F and 1R–6R in FIG. 2 are used to convert the alternating current from the power source 10 to the direct current which is used to power the DC motor armature 11.

Figure 3:
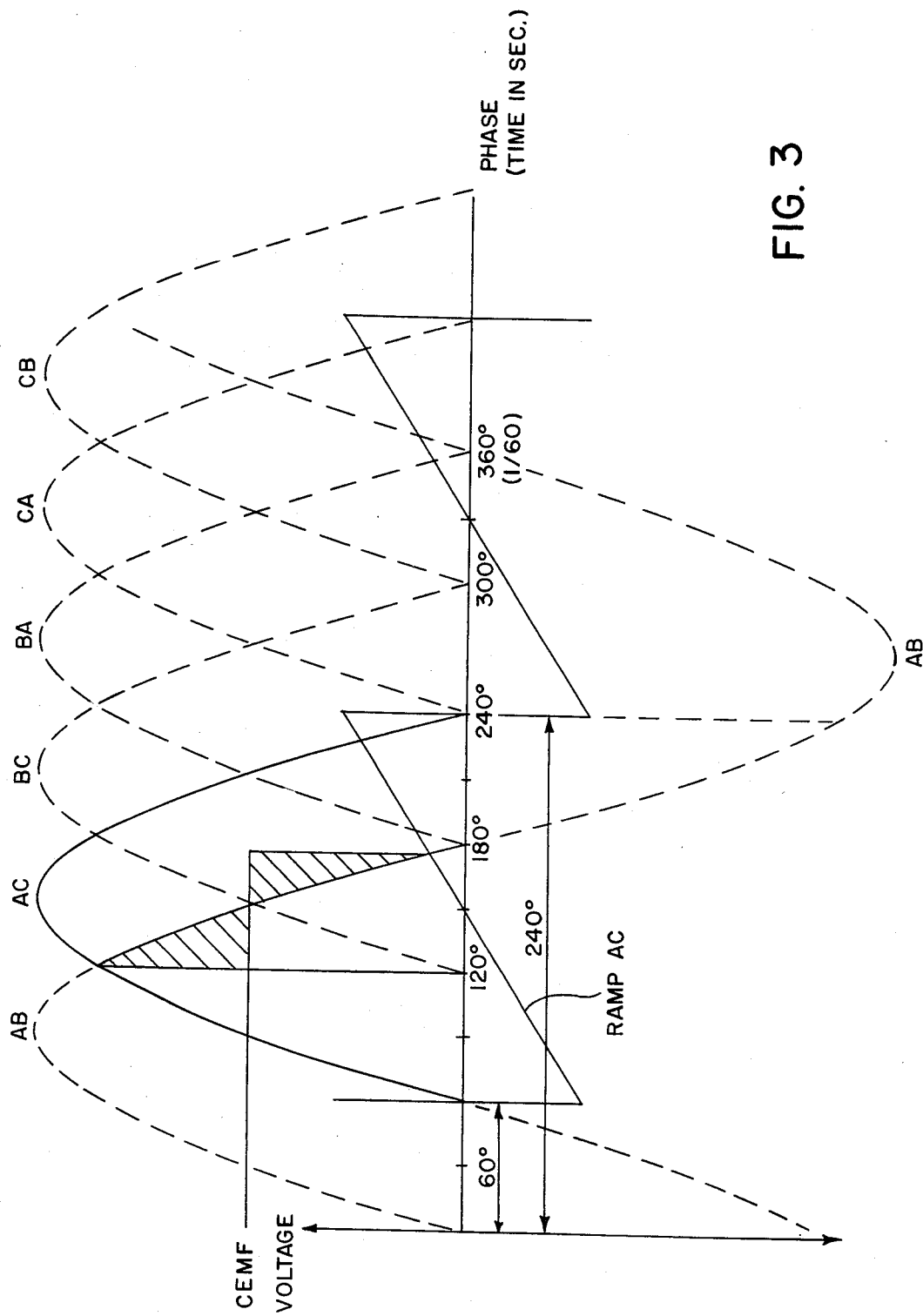
FIG. 3 is a voltage waveform diagram, showing input voltages to the SCR network of FIG. 2.

As illustrated by FIGS. 1 and 2, three conductors PA, PB and PC are connected from the three-phase AC power source 10 to the dual bridge network of SCR's. SCR's 1F–6F convert alternating current to direct current in the forward direction and SCR's 1R–6R convert alternating current to direct current in the reverse direction. The three phase conductors PA, PB and PC provide the six different line-to-line voltages seen in FIG. 3. These are referred to as AB, AC, BC, BA, CA and CB. Thus, if these six signals are used, six positive pulses or six negative pulses can be generated by the SCR's for each full cycle of a reference AC signal at 60 hertz frequency. As an example of SCR firing to generate one of these signals, it will be seen in FIG. 2 that if SCR's 1F and 6F are gated to conduct current, the current is conducted between line PA and line PB and through the motor armature 11. This has the effect of applying voltage waveform AB (seen in FIG. 3) across the motor armature. The SCR's 1F and 6F will only conduct for part of a cycle. For example, if the SCR's are gated at a firing angle of 120° as seen in FIG. 3, they will conduct only until the magnitude of AB falls a certain amount below the line representing the counter-EMF established by the motor. When the magnitude of AB falls below the value of counter-EMF, the SCR's should become reverse biased and be turned off, but in fact they continue to conduct for a time determined by the inductance of the armature winding. This time is such that the shaded area in FIG. 3 above the counter-EMF line will be equal to the shaded area below the line.

Table 1 sets forth the SCR's in the bridge which must be fired for the respective line-to-line signals illustrated in FIG. 3 to generate direct current in the forward direction.

TABLE 1

| Phase | Conducting SCR's |
|---|---|
| AB | 1F, 6F |
| AC | 1F, 2F |
| BC | 3F, 2F |
| BA | 3F, 4F |
| CA | 5F, 4F |
| CB | 5F, 6F |

Table 2 sets forth the SCR's which must be fired for the respective line-to-line signals in FIG. 3 to generate direct current in the reverse direction.

TABLE 2

| Phase | Conducting SCR's |
|---|---|
| BA | 3R, 4R |
| CA | 5R, 4R |
| CB | 5R, 6R |
| AB | 1R, 6R |
| AC | 1R, 2R |
| BC | 3R, 2R |

Referring again to FIG. 1, the firing circuits 12 provide phase-synchronized signals to the SCR's 1F–6F and 1R–6R on corresponding output lines 1F–6F and 1R–6R. These lines are coupled through pulse transformers (not shown) to the SCR's. The pulse transformers provide physical and electrical isolation between the power supply circuits and the motor control electronics. The output lines 1F–6F and 1R–6R are controlled through a set of FORWARD GATES 13 and a set of REVERSE GATES 14. These sets of gates 13 and 14 are enabled through the FORWARD and REVERSE control lines, respectively, to enable firing of SCR's 1F–6F in the forward current group or to enable firing of SCR's 1R–6R in the reverse current group.

Besides selecting one group of SCR's to be operated, pairs of SCR's within that set must be selected according to Tables 1 and 2 above, and these pairs must be operated in sequence to generate the six pulses that contribute to the direct current to the motor. The order of firing is controlled by the FIRING ORDER CONTROL GATES 15 through enable lines G1—G3 and G4—G6. Each of these lines G1—G6 is connected to one forward conducting SCR and one reverse conducting SCR. Thus, enable line G1 is connected to SCR 1F and SCR 1R, because only one of these will be enabled at any given time through the FORWARD and REVERSE GATES 13 and 14.

The FIRING ORDER CONTROL GATES 15, in turn, are operated in response to ramp firing angle signals, RAC, RBC, and RCC, which are synchronized to six phase-varying square wave signals AB, BA, BC, CB, CA and AC. The phase-varying signals are developed by a PHASE-LOCKED LOOP SYNCHRONIZER circuit 16 which operates in response to one line-to-line alternating reference signal REF AB. This signal is coupled by an AC LINE SYNCHRONIZING TRANSFORMER 10, which has a primary side connected to the power lines PA, PB and PC, and which has a secondary side connected to the PHASE LOCKED LOOP SYNCHRONIZER circuit 16. This circuit 16 develops alternating square wave signals AB, BC and CA which switch between high and low values at points corresponding to 0° and 180° phase angles of line-to-line voltages AB, BC and CA, respectively. This circuit 16 also develops the reverse phase or inverted square wave signals BA, CB and AC which correspond to the sine wave signals BA, CB and AC, respectively. The six square wave signals are coupled to the FIRING ORDER CONTROL GATES 15 and when a particular phase-synchronized square wave signal coincides with a corresponding firing angle pulse signal, two of the gates 15 are enabled to fire a pair of forward current SCR's or to fire a pair of reverse current SCR's.

The selection of SCR's for forward or reverse current conduction is controlled by a FORWARD/REVERSE LOGIC CIRCUIT 17 in FIG. 1. This circuit 17 operates in response to an armature current reference signal (IA REF), which originates from speed regulating circuitry of a type well known in the art. The armature current reference signal (IA REF) is a dual polarity signal, in which a negative polarity corresponds to a command to fire an SCR that conducts current in the forward direction, and in which a positive polarity indicates a command to fire an SCR that conducts current in the reverse direction. In response to the polarity of the IA REF signal, the FORWARD/REVERSE LOGIC circuit 17 generates logic signals on the FORWARD and REVERSE enable lines which control firing of the SCR's by controlling the FORWARD and REVERSE GATES 13 and 14.

To provide an armature current feedback loop, the armature current reference signal (IA REF) is summed at a summing junction 18 with an armature current feedback signal (IA) to generate an input signal to the ARMATURE CURRENT REGULATOR 19. To provide system stability, the armature current reference signal (IA REF) and the armature current feedback signal (IA) must be of opposite polarity. The armature current feedback signal (ABS. IA) is always a positive signal, because it is obtained by rectifying AC signals to detect a DC signal. The ABS. IA signal must therefore be inverted to a negative polarity when the armature current reference signal (IA REF) is positive (signifying firing of the reverse current SCR's). Therefore, a forward switch 20 is opened and a reverse switch 21 is closed through the FORWARD and REVERSE control lines to connect an inverter 22 in the feedback current loop and provide an IA signal of negative polarity. When the armature current reference signal (IA REF) has a negative polarity (indicating a command to fire the forward current SCR's) logic signals are generated on the FORWARD and REVERSE control lines to reverse the state of the switches and allow signal ABS. IA to bypass the inverter 22 to provide an IA signal of positive polarity.

In response to the resulting input signal, the ARMATURE CURRENT REGULATOR 19 produces a firing angle command (FAC) signal which determines the relative phase angle at which the SCR's are "turned on" or "fired". The firing angle command (FAC) signal, however, must be synchronized to the six phase-varying signals that are developed by the PHASE LOCKED LOOP SYNCHRONIZER CIRCUIT 16.

This is accomplished by the RAMP AND PULSE GENERATING CIRCUITS 23 and 24, which are the subject of the invention. As seen in FIG. 1, the six square-wave signals AB, BA, BC, CB, CA and AC are coupled to the RAMP AND PULSE GENERATING CIRCUITS 23 and 24. Other inputs to the RAMP AND PULSE GENERATING CIRCUITS 23 and 24 are the firing angle command (FAC) signal from the ARMATURE CURRENT REGULATOR 19 and a RAMP RESET signal from the PHASE-LOCKED LOOP SYNCHRONIZER circuit 16. The RAMP AND PULSE GENERATING CIRCUITS 23 and 24 provide three phase-synchronized SCR firing pulse signals RAC, RBC and RCC. These signals are coupled to the FIRING ORDER CONTROL GATES 15 along with the square wave signals AB, BA, BC, CB, CA and AC.

It is desired that the firing angle for any pair of SCR's be adjustable from 60° to 240° relative to the instantaneous line-to-line voltage applied across them. For example, if line-to-line voltage AB is applied across SCR's 1F and 6F, these SCR's should receive a gating signal in the time in which voltage AB varies from 60° to 240° of phase angle as seen in FIG. 3. Voltage AC in FIG. 3 provides a positive half-wave shape which occurs over the same time that voltage AB is varying between a phase of 60° and 240°. Therefore, it is the practice to synchronize the SCR firing signal for voltage AB to a RAMP AC signal corresponding to line voltage AC. Similarly, the firing of SCR's between 60° and 240° for the other line voltages is synchronized to signals varying between 0° and 180° over the same time period.

Figure 4:
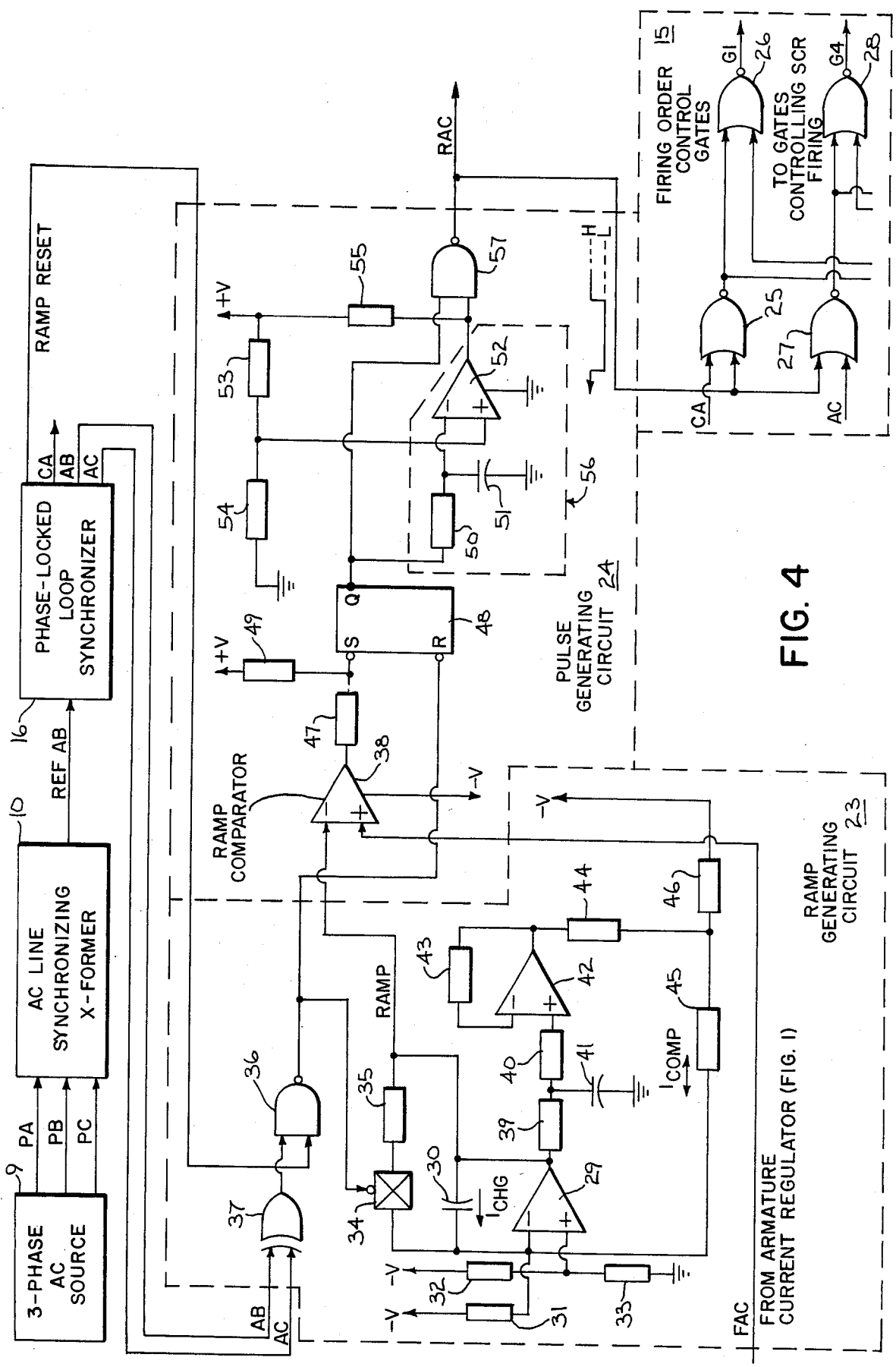
FIG. 4 is an electrical schematic diagram of the firing circuits of FIG. 1, showing the details of the circuit of the present invention.

Referring to FIG. 4, the RAMP AND PULSE GENERATING CIRCUITS 23 and 24 of FIG. 1 are shown in more detail with the RAMP GENERATING CIRCUIT 23 being distinguishable from the PULSE GENERATING CIRCUIT 24. The output of the PULSE GENERATING CIRCUIT 23 is the RAMP A firing angle signal (RAC), which is coupled to inputs on several of the FIRING ORDER CONTROL GATES 15 that have been individually shown in FIG. 4. The RAC signal is coupled with the CA square wave alternating signal through a first NOR gate 25 to one input of a second NOR gate 26. The output of this second NOR gate 26 enables the firing of SCR's 1F or 1R, depending upon conduction of forward or reverse current. When the CA signal is low (corresponding to a positive signal for signal AC), and when the RAC signal is also low, the output of the first NOR gate 25 generates a logic high signal. When this logic high signal is coupled to the second NOR gate 26 it generates a logic low signal on the G1 control line to enable the firing of SCR 1F or SCR 1R, depending upon which of these is also enabled by signals from the FORWARD-/REVERSE LOGIC CIRCUIT 17 described earlier in reference to FIG. 1.

Besides outputs G1 and G4 from the firing order control gates 26 and 28 in FIG. 4, there are four other NOR gates (not shown) with outputs coupled to control lines G3, G6, G5 and G2. The RAC signal can be coupled to any one of four "G" lines to enable firing of four SCR's in either the forward or reverse group. All of these SCR's are connected in FIG. 2 between line conductor PA and line conductor PB. The SCR's include 1F, 6F, 3F, 4F, 1R, 6R, 3R and 4R. Similarly, there are two other ramp firing signals RBC and RCC (not shown in FIG. 4) which control firing of the SCR's connected between conductors PB and PC, and conductors PC and PA, respectively.

It can also be seen in FIG. 4 that NOR gate 26, which is connected to enable line G1, will respond to a logic high signal from either of two inputs to generate a logic low enabling signal on line G1. The second input to this NOR gate 26 is controlled through a NOR gate (not shown) by the RCC signal. Thus, SCR's 1F and 1R may be fired in response to either the RAC or RCC signal. It should now be apparent how the signals RAC, RBC and RCC are used to synchronize the firing of the SCR's.

The generation of these ramp firing signals in response to the FAC signal will now be explained in relation to the circuit for generating the RAC signal, with the understanding that the RBC and RCC signals are generated in similar fashion by corresponding circuits with generally the same configuration as the circuits 23 and 24 seen in FIG. 4.

Figure 5:
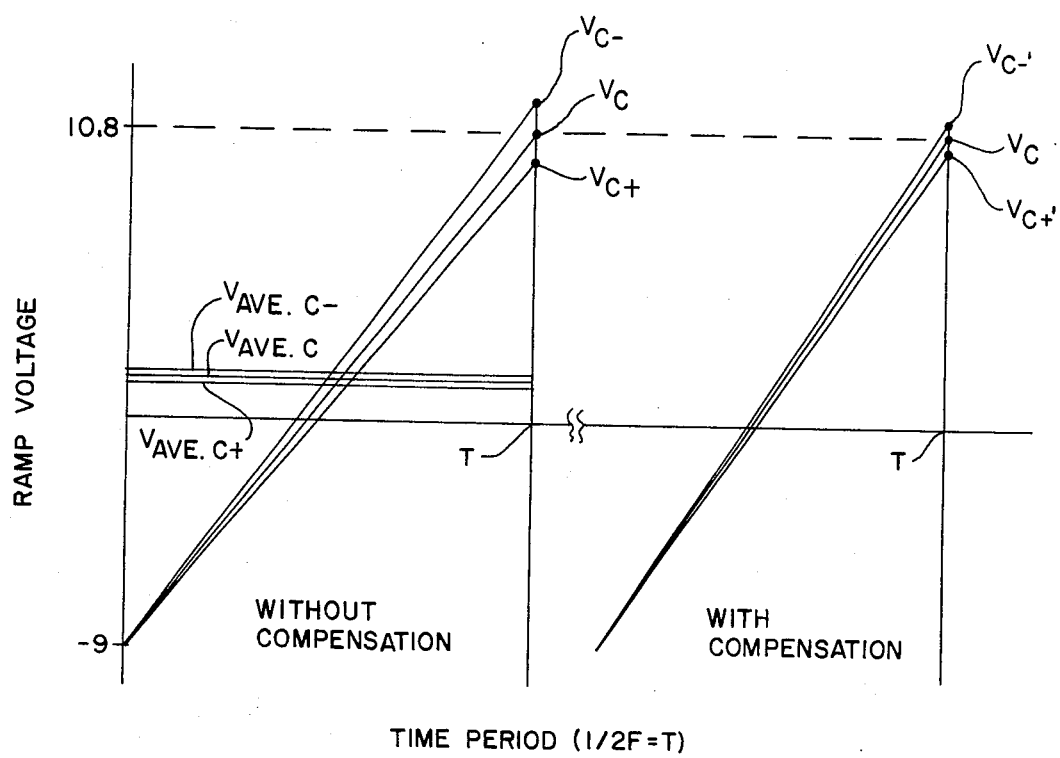
FIG. 5 is a graph of the RAMP signal of FIG. 4 as a function of time for several values of a capacitor.

Referring to the RAMP GENERATING CIRCUIT 23, a RAMP signal is provided by an operational amplifier 29 that is connected for operation as an integrator. A capacitor 30 is connected across the inverting (−) input of the operational amplifier 29 and its output. A negative biasing signal is provided to the inverting (−) input from a negative voltage source (−V) through a pull-down resistor 31. A negative biasing signal is also provided to the non-inverting (+) input by a voltage divider in which two resistors 32 and 33 are connected between a negative voltage source (−V) and ground. The non-inverting (+) input is connected to the junction between the two resistors 32 and 33 to provide a negative biasing voltage of a −9 DC volts. Signals provided at the inputs to the operational amplifier 29 from the biasing circuitry cause the capacitor to charge and the output voltage of the operational amplifier to rise from a −9 DC volts to approximately +10.8 DC volts as seen in FIG. 5. Referring again to FIG. 4, an analog switch 34 connects a resistor 35 across the capacitor 30, and when the switch 34 is closed, the capacitor 30 is discharged through the resistor 35. After this discharge the analog switch 34 is re-opened, and the biasing circuits cause the capacitor 30 to begin charging for a second cycle.

The RAMP GENERATING CIRCUIT 23 generates a sawtooth signal at twice the AC power line frequency. For example, for a power line signal at a 60 hertz frequency, the switch 34 is opened and closed to produce 120 cycles per second. The reason for this is illustrated in part in FIG. 4, where the RAC signal is coupled with signals AC and CA to control gates 25 and 27. Because the RAC signal is used to control firing of SCR's synchronized to both signal AC and signal CA in FIG. 5, two RAMP signals must be generated, one corresponding to the positive half-cycle of line voltage AC, and the other corresponding to the positive half-cycle of line voltage CA as seen in FIG. 3.

To discharge the capacitor 30 at twice line frequency, the analog switch 34 is operated in response to an enabling signal which it receives at a control input from the output of a NAND gate 36. The NAND gate 36 has one input connected to the output of an exclusive-OR gate 37 and a second input connected by a RAMP RESET control line to the PHASE-LOCKED LOOP SYNCHRONIZER circuit 16 described above in relation to FIG. 1. The RAMP RESET signal is coupled to the NAND gate 36 at six times the power line frequency. The RAMP RESET pulses are synchronized to the six respective AC waveforms. The exclusive-OR gate 37 assures that only two of the RAMP RESET pulses—corresponding to the AC and CA waveforms—are coupled through the NAND gate 36. This assures that the discharge of the capacitor 34 will be synchronized to the points where the alternating square wave signal AC (1) switches from a logic low signal to a logic high signal and (2) switches from a logic high signal to a logic low signal. These points correspond to the 0° and 180° crossing points of the AC waveform. Thus, for each line cycle, the switch 34 will be operated twice to generate a RAMP signal at twice the power line frequency.

As seen in FIG. 4, the RAMP GENERATING CIRCUIT 23 is coupled to an inverting (−) input on a RAMP COMPARATOR 38. The firing angle control (FAC) signal is coupled from the output of the ARMATURE CURRENT REGULATOR 19 in FIG. 1 to the non-inverting input of the RAMP COMPARATOR 38. The FAC signal is an analog signal proportional to the firing angle, and when the RAMP signal exceeds the FAC signal, the output of the RAMP COMPARATOR 38 is switched from one logic state to another, and this synchronizes the FAC signal to the crossing point along one cycle of the RAMP signal. Therefore, this crossing point must be controlled, or the synchronization performed by the RAMP COMPARATOR 38 will not be accurate.

As explained in the introduction, a technical problem in ramp generating circuits results from variations in the actual value of capacitors used in such circuits from their nominal or assumed values. Due to manufacturing tolerances, the capacitor 30 may vary from 1% to 10% from its nominal or rated value. It should be appreciated here that a capacitor manufactured to a 10% tolerance is a less expensive component than a capacitor manufactured to a 1% tolerance. In the integrator circuit, the actual value of the capacitor 30 will determine the actual peak voltage reached at the output of the operational amplifier 29. If capacitor 30 charges too slowly, the RAMP signal in FIG. 4 will not reach the desired peak voltage before it is discharged in response to the line frequency synchronizing signal. If the capacitor 30 charges more quickly, the desired peak voltage will be exceeded.

This is seen in the left-hand portion of FIG. 5. The peak voltage for one cycle of the RAMP signal for the nominal value of the capacitor 30 is labeled $V_C$. If the value of the capacitor 30 is greater, a lower peak voltage $V_{C+}$ will be reached over a comparable time period T. If the value of the capacitor 30 is less than assumed, a higher peak voltage $V_{C-}$ will be reached. It can be seen that this change in peak value will provide a different slope for the RAMP signal and this will move the point where the RAMP signal exceeds the FAC signal. To prevent this, the difference in peak voltage that occurs for different values of the capacitor 30 is regulated by circuitry to be described below.

Figure 6:
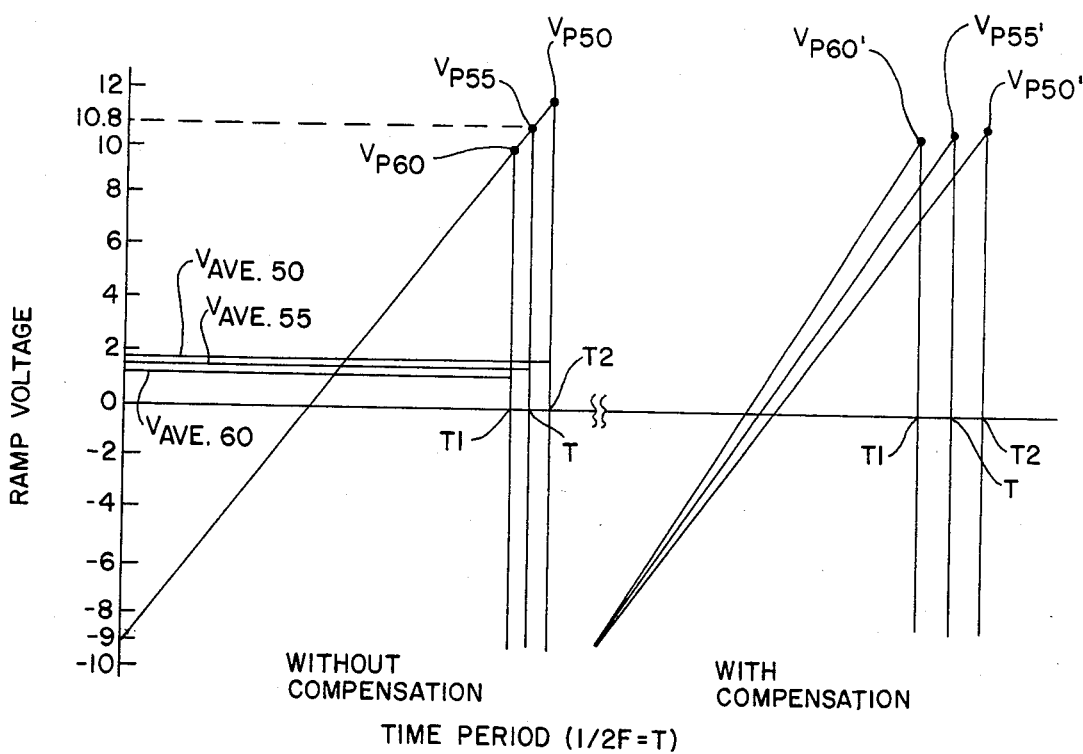
FIG. 6 is a graph of the RAMP signal of FIG. 4 as a function of two different AC line frequencies.

Referring to the left-hand portion of FIG. 6, there will be a change in the period for one cycle of RAMP signal when the AC line frequency changes. If a certain peak voltage $V_{P55}$ would be reached for a theoretical line frequency of 55 hertz, this peak value will not be reached for an AC line frequency of 60 hertz for the same value of the capacitor 30. The shorter time period will not allow the capacitor 30 to charge to $V_{P55}$. The charging rate, however, will remain the same. On the other hand, the peak value $V_{P55}$ will be exceeded for an AC line frequency of 50 hertz due to the capacitor charging at the same rate over a longer period of time. For different time periods, T, T1 and T2, the charging rate or the slope of the RAMP signal should change, and the crossing point of the RAMP signal and FAC signal should be adjusted for the different time periods. This can be accomplished by regulating the peak voltage, i.e. reducing the difference in peak voltage that occurs in response to changes in AC line frequency.

To maintain the synchronization of SCR firing to the FAC signal and to regulate the peak voltage across the capacitor 30, the invention provides feedback circuitry which is seen in FIG. 4, and which is connected between the output of the operational amplifier 29 and its inverting (−) input. The output of the operational amplifier 29 is connected through a T-section network with two series resistors 39 and 40 and shunt capacitor 41. The output of this T-section network is connected to a non-inverting (+) input on a voltage following amplifier 42. The output of this amplifier 42 is coupled through a feedback resistor 43 to its inverting (−) input. The output of the amplifier 42 is also connected through two resistors 44 and 45 to the inverting (−) input on the integrating operational amplifier 29. A negative voltage source (−V) is connected through another resistor 46 to a junction between resistors 44 and 45. This feedback circuitry will adjust the capacitor charging current to compensate for variations in the value of the capacitor 30, or to compensate for changes in the power line frequency, or both.

The value of the capacitor 30 is selected to provide the RAMP waveform seen in FIG. 5 for a power line frequency of 55 hertz and a period of T which is the inverse of twice the line frequency. The RAMP voltage will be applied to the feedback compensation circuitry as well as to the RAMP COMPARATOR 38. The values of the components in the feedback compensation circuitry are selected so that no compensation current will flow to or from the inverting (−) input of the operational amplifier 29 at the selected value of the capacitor 30 and a line frequency of 55 hertz. The inverting (−) input will be maintained at −9 DC volts by current drawn through the biasing resistor 31 by the negative voltage source (−V).

If the actual value of the capacitor 30 is less than its nominal value, the capacitor will charge to $V_{C-}$ as seen in FIG. 5. This will produce a greater average value $V_{AVE.C-}$ then the average value $V_{AVE.C}$ for the nominal value of the capacitor 30. Referring to FIG. 4, this will cause the compensation current $I_{COMP}$ to flow towards the inverting (−) input of the amplifier 29. The current flowing from that junction through resistor 31 remains constant, so the charging current $I_{CHG}$ through the capacitor will be decreased to reduce the peak voltage $V_{C-}'$ seen in the right-hand portion of FIG. 5. In the reverse situation, a capacitor value greater than the nominal causes compensation current $I_{COMP}$ to flow away from the inverting (−) input of the amplifier and increases the charging current to the capacitor to increase the peak value to $V_{C+}'$.

For a constant value of AC line frequency, e.g. a theoretical 55 hertz, a variation between the actual value of the capacitor 30 and its assumed value of −5% will cause a change in peak voltage only +0.36%. This provides an error reduction of 13:1. A 10% tolerance capacitor 30 becomes as effective as 1% tolerance component used without the compensation circuit. More importantly, the compensation circuit provides balanced synchronization where the firing angle control (FAC) is being synchronized to three different ramp signals.

If the actual value of the capacitor 30 is equal to its assumed or nominal value, and the line frequency is in fact 60 hertz, the time period will become T1, which is seen in FIG. 6 to be shorter than time period T. Without the compensation circuit, the capacitor 30 will charge at the same rate as it would for a 55 hertz line frequency, but due to the shorter time period it will not reach the same peak value. Also, the average value of the RAMP voltage, which is also its DC value will be smaller than $V_{AVE.55}$ level seen in FIG. 6 for the waveform reaching +10.8 volts. With the compensation circuit this will cause the compensation current $I_{COMP}$ in FIG. 4 to flow away from the inverting (−) input of the operational amplifier 29 through resistor 45. It will also cause an increase in charging current $I_{CHG}$ so that the peak voltage for 60 hertz ($V_{P60}'$) approaches the peak voltage for 55 hertz ($V_{P55}'$). The peak voltage $V_{P60}'$ will change the slope of the RAMP waveform for 60 hertz as compared with the waveform for 55 hertz. This is necessary, however, to maintain synchronization to the shorter time period.

If the actual value of the capacitor 30 is equal to its assumed or nominal value, and the power line frequency is in fact 50 hertz, the time period will be extended to T2 as seen in FIG. 6. The tendency of the peak voltage $V_{P50}$ to increase will generate a flow of current $I_{COMP}$ towards the inverting (−) input of the operational amplifier 29. Since the voltage at the inverting (−) input is a constant −9 DC volts, this current flow will result in a lower $I_{CHG}$ current, so that the current through resistor 31 remains constant. The decrease in the $I_{CHG}$ current will adjust the peak voltage $V_{P50}'$ downward—close to the peak voltage $V_{P55}'$. This again results in a change in the slope of the RAMP signal, which is necessary occurrence for changes in line frequency.

As seen in FIG. 4, the RAMP COMPARATOR 39 is part of the PULSE GENERATING CIRCUIT 24. After synchronizing the firing angle control (FAC) signal to a ramp pulse, the synchronized signal is converted to a logic level pulse. The output of the RAMP COMPARATOR 38 is coupled through a resistor 47 to a set (S) input on a S-R flip-flop 48. The set input of the flip-flop 48 is also coupled through a pull-up resistor 49 to a positive voltage source (+V). The reset (R) input on this flip-flop 48 receives the same signal that is used to operate the analog switch 34 to discharge the capacitor 30. The flip-flop 48 has a Q output coupled to one input of a two-input NAND gate 57 that generates the RAC signal from its output. The Q input is also connected through a timing circuit 56 to the other input of this NAND gate 57. The timing circuit 56 includes a series resistor 50 and a shunt capacitor 51 which are connected to an inverting (−) input on a comparator 52. The non-inverting (+) input is connected between two resistors 53 and 54 in a biasing network, one resistor 53 being connected to a positive voltage source (+V) and the other resistor 54 being connected to the ground. The positive voltage source (+V) is also connected to the output of the comparator 52 and to the second input of the NAND gate 57 through a pull-up resistor 55.

As represented in FIG. 4, the RAC signal is a logic low pulse with a leading edge at the transition from high to low. The leading edge is generated when the flip-flop is set to generate a logic high signal from its Q output to the first input on the NAND gate 57. The other input of this NAND gate 57 is held high through the pull-up resistor 55. The comparator 52 also has a logic high level at its output, so that the logic high from the flip-flop 48 causes the output of the NAND gate 57 to switch low and generate the leading edge of the RAC pulse. The logic high signal at the Q output also causes the capacitor 51 to charge. When the capacitor 51 charges to a positive voltage greater than the positive biasing voltage at the non-inverting (+) input, the comparator 52 switches its output to a logic low level. A logic low at either input to the NAND gate 57 will cause it to switch high, which it does in this circumstance to create the trailing edge of the RAC pulse. The values of the resistor 50 and capacitor 51 and the resistor 53 and 54 in the biasing network are selected to set a suitable time period of the RAC pulse. When the flip-flop 47 receives a signal at its reset (R) output it switches its Q output to a logic low level. This allows the capacitor 51 to discharge and the output of the pulse timing comparator 52 to go high, but this does not affect the logic state of the RAC signal.

The integrated circuits that can be used in the circuits illustrated in FIG. 4 are as follows:

| Reference No. | Component | Description |
| --- | --- | --- |
| 29, 42 | operational amplifiers | LM 348 operational amplifiers manufactured by National Semiconductor Corp. |
| 34 | analog switch | DG 211 analog switch manufactured by Signetics Corp. |
| 36, 57 | NAND gate | MC14011 two-input NAND gate manufactured by Motorola, Inc. |
| 37 | EX-OR gate | MC14070 two-input exclusive -OR gate |

-continued

| Reference No. | Component | Description |
|---|---|---|
| | | manufactured by Motorola, Inc. |
| 38, 52 | comparators | LM 339 comparators manufactured by National Service-conductor Corp. |
| 48 | flip-flop | MC14044 NAND R-S Latch manufactured by Motorola, Inc. |
| 25-28 | NOR gates | MC 14001 two-input NOR gates manufactured by Motorola, Inc. |

From this description of the RAMP AND PULSE GENERATING CIRCUITS 23 and 24, it should now be apparent, how the RAMP signals are related to firing the SCR's, and how the RAMP signals are automatically regulated in response to varying values of capacitors or in response to changes in power line frequency. Certain modifications to the preferred embodiment might be made by those skilled in the art without departing from the principles of the invention, so to apprise the public of the full scope of the invention the following claims are made.

I claim:

1. A circuit for automatically regulating ramp signals generated in response to an AC line frequency of either 50 or 60 hertz, the circuit comprising:
   an integrating circuit with an operational amplifier, with a capacitor connected between an output and an inverting input of the operational amplifier, and with biasing means coupled to the operational amplifier to charge the capacitor and generate a ramp signal at the output of the operational amplifier;
   reset means, coupled across the capacitor and responsive to a signal synchronized to the AC line frequency, for discharging the capacitor and generating ramp signals at a frequency related to the AC line frequency; and
   compensation means, coupled in parallel with the capacitor and coupled to the output of the operational amplifier, for adjusting charging current to the capacitor in response to variations in average value of voltage across the capacitor, to compensate for variations in line frequency.

2. The circuit of claim 1, wherein the compensation means is also responsive to variations in the average value of voltage across the capacitor that are due to variations between the actual value and the nominal value of the capacitor to adjust charging current to the capacitor and thereby regulate peak voltage across the capacitor.

3. An SCR firing circuit for controlling SCR's that couple power from one phase of a three-phase AC source to a DC motor, the SCR firing circuit being of the type with comparator means responsive to an unsynchronized firing angle signal and to a phase-synchronized digital pulse that controls the angle of firing of the SCR's, with means for generating phase-synchronized reference signals, with an operational amplifier and with a capacitor connected between an inverting input and an output of the operational amplifier to generate the phase-synchronized analog signal as the capacitor is charged, wherein an improvement comprises:
   reset means connected across the capacitor and responsive to the phase-synchronized reference signals to periodically discharge the capacitor relative to the AC line frequency to generate a phase-synchronized analog signal at a frequency related to the AC line frequency; and
   feedback compensation means connected to the output and to the inverting input of the operational amplifier and in parallel with the capacitor and responsive to variations in average value of voltage across the capacitor to adjust charging current to the capacitor to compensate for variations between the actual value of the capacitor and its nominal value or to compensate for changes in line frequency.

* * * * *